3,211,774
PROCESS FOR PREPARING AROMATIC ESTERS OF CHLOROFORMIC ACID
Curtis Wayne Stephens, Wilmington, Del., assignor to E. I. du Pont de Nemours and Company, Wilmington, Del., a corporation of Delaware
No Drawing. Filed Jan. 22, 1963, Ser. No. 253,045
8 Claims. (Cl. 260—463)

This invention relates to a novel process for preparing aromatic esters of chloroformic acid. More particularly, it relates to the preparation of such esters by the reaction of a phenolic compound with phosgene in the presence of a catalyst.

Esters of chloroformic acid, the so-called chloroformates, have been prepared for many years, and have been recognized as useful intermediates in the preparation of numerous types of organic compounds. Such choloroformates possess reactive acid chloride groupings which are capable of condensation with compositions of matter which contain active hydrogen atoms. Thus, they may be reacted with primary or secondary amines to form urethanes, with compounds which contain hydroxyl groups to form diesters of carbonic acid, and with other similar types of organic compositions which contain active hydrogen atoms.

Chloroformates are prepared by the reaction of hydroxyl-bearing organic compositions with phosgene under a variety of conditions; the aliphatic chloroformates may be formed by simply contacting the alcohol with phosgene. Aromatic chloroformates, however, have required appreciably different conditions of preparation, and the direct reaction between a phenolic compound and phosgene has not been possible. Thus, the preparation of aromatic chloroformates has been effected generally by the reaction of phosgene with the appropriate sodium phenolate, either in aqueous solution or slurried in an organic solvent. Alternatively, the preparation has been carried out by the reaction of the phenol with a solution of phosgene in the presence of a molar equivalent quantity of a tertiary amine which serves as an acceptor for the hydrogen chloride generated by the reaction. In either case, however, it is necessary to separate the desired chloroformate from its preparative medium by a process which is time-consuming and costly.

It is an object of this invention to provide a novel preparative process for aromatic chloroformates.

It is a further object of this invention to provide a novel process for the direct reaction between a phenolic compound and phosgene.

It is a still further object of this invention to provide a novel process for the preparation of aromatic chloroformates by which they are produced in the absence of acid acceptors from the reaction of a phenolic compound with phosgene in the presence of a catalyst.

In accordance with these objects, a phenolic compound, containing a single phenolic hydroxyl functional group or a plurality of such groups, is reacted with phosgene in the presence of a catalytic agent selected from the group consisting of carbonamides, thiocarbonamides, phosphoramides and sufonamides derived from the secondary amines and preferably having no more than three nitrogen atoms. These can be represented by the formula

wherein X is a member of the group consisting of

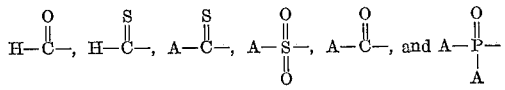

and in which A, R, and R' are organic radicals. R and R', which may be the same, are preferably alkyl radicals containing one to four carbon atoms, or monovalent aromatic hydrocarbon radicals containing six to eight carbon atoms. R and R' may together form and be part of a cyclic structure containing from three to six carbon atoms in the ring, and R and X may together form and be part of a cyclic structure containing from three to six carbon atoms in the ring. Thus, X may represent a radical selected from the group represented by the following formulae:

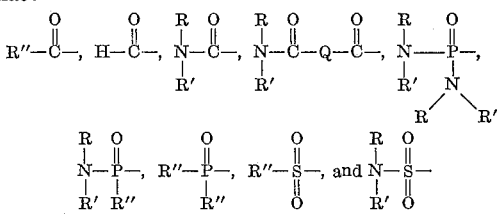

and the thio analogues of the carbonyl radicals, and wherein R and R' have the same significance as above; Q is a carbon-to-carbon bond or a divalent hydrocarbon radical, preferably containing one to eight carbon atoms; and R" is an alkyl radical of from one to six carbon atoms, or an aromatic monovalent hydrocarbon radical of from six to eight carbon atoms, R" may combine with R or R' to form a cyclic structure containing from five to seven nuclear atoms. Aliphatic is intended to include cycloaliphatic as well as the non-cylic structures. The reaction is effected at a temperature of between about 80° and about 200° C. at superatmospheric, i.e., autogenous or higher pressure without the need of solvents and/or acid-acceptors.

Among suitable phenolic compounds which may be utilized in the preparation of the aromatic chloroformates of this invention may be named any mono-functional or poly-functional phenols; these may, additionally, bear other nuclear substituents which are not reactive under the conditions of condensation employed. Among suitable mono-functional compositions are included phenol itself and β-naphthol; halophenols, as o-chlorophenol, p-bromophenol, 2,5-dichlorophenol, 2,4,6-tribromophenol, and other similarly halogenated phenols; cresols and other phenolic compounds which bear nuclear substituents of the aliphatic, cycloaliphatic, or aromatic hydrocarbon types, as, e.g., 2-ethylphenol, p-cyclohexylphenol, o-hydroxydiphenol; and other similarly substituted compositions. Among polyfunctional phenols, hydroquinone, 2,7-dihydroxynaphthalene, or their nuclearly-substituted analogs may be employed. Additionally, those dihydric or polyhydric phenols which have two or more aromatic nuclei joined by a carbon-to-carbon bond, an alkylidene group, sulfone linkage, or other small linking groups may be employed. Included in this latter category are biphenol, 4,4'-methylene bisphenol, 4,4'-isopropylidene bisphenol, 4,4'-dihdroxydiphenyl sulfone, and other similar bisphenols, including their nuclearly-substituted derivatives as, e.g., 4,4'-isopropylidene-bis(2,6-dichlorophenol). Among the polyfunctional phenolic compounds, it is preferred that difunctional substances be employed whose nuclei are stable under the reaction conditions. Where two phenolic hydroxyl groups are present on the same aromatic nucleus, it is preferred that they should be non-adjacent to one another.

By the process of this invention, the appropriate phenolic compound is reacted with phosgene in accordance with the following equation, thereby producing the desired aromatic chloroformate, i.e., the desired aromatic ester of chloroformic acid:

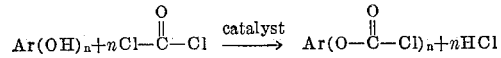

wherein $n$ is an integer, preferably 1 or 2 and $Ar(OH)_n$ represents a phenolic compound. As is noted from the equation, the reaction proceeds by the direct combination of the phenolic compound and phosgene. As distinct from previous preparations of chloroformates, it is neither necessary nor desirable that the phenolic compound be employed in the form of its sodium salt, nor is a solvent or acid-acceptor required.

The catalytic agents suitable for the process of this invention comprise: (a) N,N-disubstituted alkanamides such as N,N-dimethylformamide, N,N-diethylformamide, N,N-dimethylacetamide, N,N-diphenylacetamide, N,N-diethylvaleramide, N-methyl-N-isopropylbutyramide, and N,N-di-n-butyltrimethylacetamide, (b) N,N-disubstituted amides of aromatic acids for example, N,N-dimethylbenzamide and N-methyl-N-ethyl-m-toluamide; (c) N,N-disubstituted sulfonamides such as N,N-dimethyl-methylsulfonamide, N,N-diethyl-n-propylsulfonamide, N-ethyl-N - secbutyl - ethylsulfonamide, N,N-dimethyl-benzenesulfonamide, and N-ethyl-N-n-propyl-m-toluenesulfonamide; (d) tetrasubstituted sulfamides such as tetramethylsulfamide and tetra-n-propylsulfamide; (e) N,N,N',N'-tetrasubstituted bis-amides of dibasic acids such as N,N,N',N'-tetraethylmalonamide, N,N,N',N' - tetramethyladipamide, and N,N,N',N'-tetramethylterephthalamide; and polyamides such as poly(acrylic acid dimethylamide); (f) tetrasubstituted ureas such as tetramethylurea; (g) fully substituted phosphoramides such as hexamethylphosphoramide; and (h) cyclic analogues of the hereinabove-mentioned agents such as N-methyl-2-pyrrolidone, N-methylcaprolactam, N-isobutyl-2-pyrrolidone, N-methylvalerolactam, N-acetylpiperidine, N-formylpyrrolidine, N-acetylpyrrolidine, N-benzene-sulfonylpyrrolidine, and 2-methylisothiazolidine-1,1-dioxide and their analogues of the carbonamides of (a) and (b) above such as N,N-dimethyl thioformamide.

The above-described catalytic agents, when present in minor amounts in mixtures of phenolic compounds and phosgene under the stated reaction conditions, are effective in promoting the formation of the chloroformate derivatives of said phenolic compounds. The catalytic agents are normally present to the extent of from about 2% to about 6% by weight of the phenolic component, although quantities as low as 0.5% or as high as 10% or more may be used if desired. The proportion of catalytic agents selected will be governed by such factors as the relative reactivity of the phenolic compound, the reaction temperature, and the duration of the desired reaction period. It is neither necessary nor deisrable that the catalytic agent be present to the extent of 1 mol or more per mol of phenolic compound; the function of the agent is therefore not merely that of an acid-acceptor. On the other hand, the effectiveness of the agents named above as catalysts for the formation of aromatic chloroformates may be demonstrated by the fact that, in their absence, substantially none of the chloroformate is formed from the mixture of the phenolic compound and phosgene, and that their presence in the above-stated catalytic quantities makes possible the formation of the chloroformate in substantial amount, generally 60% or more of the phenolic compound being converted to the corresponding chloroformate, as will be further disclosed in the examples which follow.

By the process of this invention it has now become possible to readily prepare previously unknown aromatic chloroformates, particularly those derived from phenolic compounds wherein one or more phenolic hydroxyl groups has reduced reactivity because of the presence of one or more large non-reactive substituent groups in a position ortho to said hydroxyl groups. Included among such so-called hindered phenols is 2,5-di-t-butylhydroquinone.

The process by which the aromatic chloroformates are prepared in accordance with this invention involves the addition of the phenolic compound, the appropriate amount of the catalytic agent, and a slight molar excess of phosgene to a reaction vessel which may be sealed and heated during the course of the subsequent condensation reaction. Addition of the phosgene to the reaction vessel may be accomplished by condensing the reactant into the cooled vessel, inasmuch as the normally gaseous material is liquefied at temperatures below about 8° C. at atmospheric pressure. An excess of phosgene is normally employed to aid in obtaining a more complete conversion of the phenolic compound to the desired chloroformate and to minimize side reactions; the quantity of phosgene may be as much as 5 molecules or more for each hydroxyl group present in the phenolic compound, there being nothing critical in the upper limit, although the preferred ratio is 1–1.4. If desired, less than the theoretical quantity of phosgene may be used, for example, 0.7 molecule of phosgene per hydroxyl group, although this will, of course, reduce the proportion of phenolic compound converted to the chloroformate.

When operated as a batch process, and following the addition of starting materials to the reaction vessel, the vessel is sealed to prevent loss of reactants and heated to bring the reaction mixture within the vessel to a temperature within the range of from about 80° C. to about 200° C., preferably below 170° C.; the mixture is maintained at that temperature for a period of from about 1 hour to about 10 hours. During the course of the reaction, the pressure in the vessel rises to an autogenous pressure in excess of normal atmospheric pressure. Upon completion of the reaction time, the vessel is permitted to cool, the gaseous components of the reaction mixture (notably excess phosgene and by-product hydrogen chloride) are permitted to escape, and the residual material is subjected to purification in any of several ways known to the art. The mixture may be treated with a selective solvent to separate the catalytic agent from the chloroformate. Alternatively, this separation may be accomplished by recrystallization concurrently with the separation of the desired chloroformate product from any unreacted phenolic starting material.

Although amides having no more than three nitrogen atoms are the preferred catalysts of this invention, a material containing a greater plurality of amide functions may be utilized as the catalytic agent. Suitable polycarbonamides comprise: (a) hydrocarbon derivatives bearing a plurality of carbonamide groups derived from secondary amines, such as the pyromellitic tetramide wherein each of the four nitrogen atoms bears two methyl groups; (b) polyamides wherein the amide groups are part of the polymer chain, said amide groups bearing a lateral lower alkyl substituent on each nitrogen atom, such as a poly(N,N'-dimethylhexamethylene-diamine adipamide) having a molecular weight of about 5,000 or more; and (c) polyamides wherein the amide groups occur as lateral substituents on a hydrocarbon chain, such as poly(N,N-dimethylacrylamide).

The following examples illustrate the present invention, but are not intended to limit it in any way. These examples are suitably carried out in vessels made from commercial alloys that are highly resistant to attack by hydrogen chloride, as for example the high-nickel content "Hastelloy B" or "Hastelloy C."

*Example 1*

To a 1000 cc. Hastelloy bomb are added 100 grams (0.909 mol) of hydroquinone and 5 ml. of N,N-dimethylformamide. To this mixture, maintained at a temperature of about −40° C., are added 250 grams (2.525 mols) of phosgene. The bomb is sealed and heated for a period of eight hours at a temperature of 110° C. After permitting the reaction vessel and its contents to cool, the hydrogen chloride produced as by-product of the reaction and excess phosgene are permitted to escape, and the product, i.e., p-phenylene bischloroformate, is removed from the bomb. The residue is dried to constant weight in an evacuated oven at 60° C. 243 grams of the product are obtained. It is purified by recrystallization from hexane, followed by distillation under reduced pressure and is recovered. Its melting point is found to be 98–100° C. An 89% conversion was achieved. The infrared spectrum of this product is free of absorption bands normally characteristic of the hydroxyl function, and corresponds to that expected from hydroquinone bischloroformate.

*Example II*

A procedure analogous to that described in the preceding example is utilized in the preparation of the bischloroformate of 2,2-bis(hydroxyphenyl) propane. To a reaction vessel of the type described are added 20 grams (0.088 mol) of 2,2-bis(4-hydroxyphenyl) propane, 1 ml. of N,N-dimethylformamide, and 100 grams (1.01 mols) of phosgene. Following heating for eight hours at a temperature of 100° C., the product is isolated and recrystallized from hexane. The bischloroformate is recovered and its melting point is 93.5–95.5° C. A 73% conversion was achieved.

*Example III*

By a procedure analogous to that described in Example I, 20 grams (0.108 mol) of p,p'-biphenol, 1 ml. of N,N-dimethylformamide, and 100 grams (1.01 mol) of phosgene are heated in a reaction vessel for a period of eight hours at a temperature of 160° C. Following isolation and purification in the usual manner, the p,p'-biphenol bischloroformate is found to exhibit a melting point of 127–130° C. An 81% conversion was achieved.

*Example IV*

By a procedure analogous to those described previously, 20 grams (0.055 mol) of 2,2-bis(4-hydroxy-3,5-dichlorophenyl) propane, 1 ml. of N,N-dimethylformamide, and 100 grams (1.01 mol) of phosgene are heated in a sealed reaction vessel at a temperature of 130° C. for a period of eight hours. Following isolation and purification by recrystallization from hexane, 2,2-bis(4-chloroformoxy-3,5-dichlorophenyl) propane was obtained in 79% conversion.

*Example V*

A procedure analogous to those previously described is employed in the reaction of 80 grams (0.85 mol) of phenol and 100 grams (1.01 mol) of phosgene in the presence of 2 ml. of N,N-dimethylformamide. The mixture in a sealed reaction vessel is heated to a temperature of 100° C. for a period of eight hours, following which the phenyl chloroformate is obtained after purification by distillation. A conversion of 74% was achieved. The product exhibits a boiling point of 95° C. at a pressure of 20 mm.

*Example VI*

A procedure analogous to those described in the preceding examples is employed in the reaction of 40 grams (0.364 mol) of hydroquinone with 100 grams (1.01 mol) of phosgene in the presence of 2 ml. of N,N-dimethylacetamide. Following heating of the reaction mixture in a sealed reaction vessel for a period of eight hours at a temperature of 110° C., the product is isolated and purified by recrystallization from hexane. A product identical with that of Example I is obtained. A 60% conversion was achieved.

*Example VII*

By a procedure analogous to those previously described, 40 grams (0.364 mol) of hydroquinone, 2 ml. of N-methylpyrrolidone, and 100 grams (1.01 mol) of phosgene are heated in a sealed reaction vessel for a period of eight hours at a temperature of 110° C. The vessel is cooled and the product is isolated and purified by recrystallization from hexane. The resulting bischloroformate is found to be identical with the product of Example I. A 73% conversion to the bischloroformate was achieved.

*Example VIII*

A procedure analogous to those described in the preceding examples is employed in the reaction of 40 grams (0.364 mol) of hydroquinone with 100 grams (1.01 mol) of phosgene in the presence of 2 ml. of N,N,N',N'-tetramethylurea. Following heating of the reaction mixture in a sealed reaction vessel for a period of eight hours at a temperature of 110° C., the product is isolated and purified by recrystallization from hexane. A product identical with that of Example I is obtained at a conversion of 84%.

*Example IX*

By a procedure analogous to those previously described, 40 grams (0.364 mol) of hydroquinone, 2 ml. of N,N-dimethylmethylsulfonamide, and 100 grams (1.01 mol) of phosgene are heated in a sealed reaction vessel for a period of eight hours at a temperature of 110° C. The vessel is cooled and the product is isolated and purified by recrystallization from hexane. The resulting bischloroformate is obtained at a conversion of 76%, and is found to be identical with the product of Example I.

*Example X*

The procedure described in the preceding examples is utilized in effecting a reaction between 63 grams (0.368 mol) o-phenylphenol and 100 grams (1.01 mol) or phosgene in the presence of 3 ml. of dimethylformamide. This mixture is heated at 150° C. for 8 hours, and is thereafter rectified by distillation at about 130° C. and pressure of about 1–3 mm. The oily product solidifies on standing and is identified as o-phenylphenyl chloroformate by analysis; found—67.2% carbon, 3.98% hydrogen, 13.37% oxygen, and 15.31% chlorine; calculated for $C_{13}H_9O_2Cl$: 67.11% carbon, 3.90% hydrogen, 13.75% oxygen, and 15.24% chlorine.

*Example XI*

By a procedure analogous to those of preceding examples, 20 grams (0.182 mol) of hydroquinone and 100 grams (1.01 mol) of phosgene are heated together in a sealed reaction vessel for a period of eight hours at a temperature of 110° C. in the absence of the catalytic agent of this invention. At the completion of the reaction time, the vessel and its contents are permitted to cool, excess gases are permitted to escape, and the reaction mixture is examined. The total amount of hydroquinone originally introduced is recovered unchanged.

*Example XII*

A procedure analogous to those described in the preceding examples is employed in the reaction of 100 grams (0.56 mol) of 2,4,6-trichlorophenol with 200 grams (2.02 mols) of phosgene in the presence of 5 ml. of N,N-dimethylformamide. Following heating of the reaction mixture in a sealed reaction vessel for a period of 8 hours at a temperature of 150° C., the product is isolated by distillation. The chloroformate is obtained in 91.5% yield, and exhibits a boiling point of 90° C. at a pressure of 1.4 mm. This distilled product is found by analysis to contain 32.5% carbon, 0.76% hydrogen, 12.14% oxygen, and a high proportion of chlorine (54.6% by difference); theory for 2,4,6-trichlorophenyl chloroformate is 32.35% carbon, 0.78% hydrogen, 12.31% oxygen, and 54.57% chlorine.

*Example XIII*

A procedure analogous to that described in Example I is employed in carrying out a reaction utilizing a mixture of 40 grams (0.364 mol) hydroquinone, 100 g. (1.01 mol) phosgene, and 2 ml. hexamethylphosphoramide. After this mixture is maintained at 110° C. for 8 hours and then rectified by the usual procedure, a product identical with that of Example I is obtained in 90% conversion.

The hexamethylphosphoramide in the above reaction is replaced with 4 ml. of a commercial N,N-disubstituted fatty acid amide, "Ethomid 20," made by Armour and Co. from natural sources. This amide is derived from coco acid and has the general formula

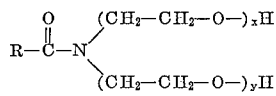

wherein $x$ and $y$ are integers totalling about 10, and R is a mixture of predominantly n-alkyl groups containing 7–17 carbon atoms. A product comprising hydroquinone bischloroformate is obtained in 77% conversion.

Example XIV

By a procedure analogous to those previously described, 20 grams (0.18 mol) of hydroquinone, 1 ml. of N,N-dimethylformamide, 40 grams (0.40 mol) of phosgene, and 200 ml. of methylene chloride are heated together in a sealed reaction vessel to examine the effect of a solvent upon the course of the reaction. Following heating to a temperature of 110° C. for a period of 8 hours, the solvent is evaporated and the product is isolated and purified in the usual manner. The product, hydroquinone bischloroformate, is obtained in 65% conversion.

Example XV

By a procedure analogous to those previously utilized, 110 grams (1.0 mol) of hydroquinone, 5 ml. of N,N-dimethylformamide, and 198 grams (2.0 mols) of phosgene are heated together in a sealed reaction vessel for a period of 8 hours at a temperature of 110° C., to determine the effect of utilizing the calculated theoretical quantity of phosgene. A product identical with that of Example I, i.e., hydroquinone bischloroformate, is obtained in 79% conversion upon purification of the reaction mixture.

Example XVI

A procedure analogous to those previously employed is utilized in a reaction between 100 grams (0.61 mol) of 2,5-di(t-butyl) hydroquinone, 5 ml. of N,N-dimethylformamide and 200 grams (2.02 mols) of phosgene. The mixture is heated in a sealed reaction vessel for a period of 8 hours at a temperature of 150° C. Following isolation of the product in the normal manner, it is purified by distillation under reduced pressure; 2,5-di(t-butyl) hydroquinone bischloroformate is obtained in 74% conversion. This product is found to contain 20.42% chlorine; the calculated value is 20.88% chlorine.

Example XVII

The procedure of the preceding examples is followed utilizing a mixture of 100 g. (0.381 mol) 2,4,6-tri-t-butylphenol, 200 g. (2.02 mols) phosgene, and 5 ml. of N,N-dimethylformamide. After this mixture is heated at 150° C. in a sealed vessel for 8 hours, it is cooled to about 50° C., vented, and subjected to the vacuum provided by a water aspirator. The residual semi-solid product is dissolved in methylene chloride; the resulting solution is then washed with water and dried over anhydrous calcium chloride. The solvent is evaporated from this dried solution, and the residual material is subjected to vacuum distillation to provide 2,4,6-tri-t-butylphenyl chloroformate, which analyzes correctly for the formula $C_{19}H_{29}O_2Cl$.

Example XVIII

A mixture of 200 g. (0.66 mol) 2,2-bis(3-chloro-4-hydroxyphenyl) propane, 200 g. (2.02 mols) phosgene, and 5 ml. N,N-dimethylformamide is heated in a closed vessel at 140° C. for 8 hours. The product mixture is freed of low-boiling components by the usual procedure, and then subjected to rapid distillation at about 1 mm. The initially liquid product, i.e., 2,2-bis(3-chloro-4-chloroformoxyphenyl) propane, solidifies on standing, the solid melts at about 52° C.

Example XIX

The procedure of Example XVIII is utilized in converting 2,2-bis(3,5-dibromo-4-hydroxyphenyl) propane to its bischloroformate. However, the product is isolated from the residue in the reaction vessel by extraction with hot hexane, from which it is then crystallized. The 2,2-bis(3,5-dibromo-4-chloroformoxyphenyl) propane is obtained in about 80% conversion, and melts at 161–162° C.

Example XX

The procedure of Example XIX is followed in converting 2,2'-methylenebis(3,4,6-trichlorophenol) (hexachlorophene) to its bischloroformate, 2,2'-methylenebis(3,4,6-trichlorophenylchloroformate) which is recrystallized from acetone/hexane in the form of needles that melt at 175–176° C.

Example XXI

The procedure of Example XX is employed in converting phenolphthalein to its bischloroformate, which precipitates from acetone/hexane as a viscous oil. Presence of the bischloroformate structure is demonstrated by reaction of this oil with piperazine, a solid polyurethane being obtained.

Although the process of this invention has been exemplified with batch-type procedures, continuous operation may also be utilized without departing from the inventive concept. Suitable means for operation as a continuous process will be apparent to those skilled in the art. For example, separate feeds of phosgene, a phenolic compound, and a catalytic agent may be introduced simultaneously and continuously into a reaction vessel that is closed to the atmosphere and provided with heat exchange means for maintaining the reaction mixture at a desired temperature, product being simultaneously withdrawn from the vessel at a rate controlled so as to maintain a constant quantity of reactants in the vessel. The size of the vessel and the throughput rate are selected so as to give an average residence time of, for example, 2 hours. The vessel may be a single chamber, a plurality of interconnected chambers, or a long pipe. Means for providing intermixing of the reactants within the vessel may suitably be provided. The reaction product withdrawn from the vessel is rectified by distillation or other suitable means to remove by-product hydrogen chloride and to isolate the chloroformate product. Unchanged phenolic compound, phosgene, and catalyst are returned to the reaction vessel together with additional starting materials.

The formation of chloroformates by the process of this invention is facilitated when the phenolic compound is in a liquid state under the reaction conditions; many such compounds are liquid under these conditions. High-melting phenols may be converted to a liquid state by dissolution, either in excess phosgene serving as a solvent, or by utilizing a separate inert solvent such as methylene chloride, chloroform, or chlorobenzene.

The novel process of this invention makes possible the rapid conversion of phenolic compositions to the corresponding chloroformates in high yield by a simple technique. Isolation of the desired products is readily effected without the need for costly and time-consuming separation from by-products, and products of high purity are quickly obtained. A measure of the high order of purity may be illustrated by the fact that, where dihydric phenols are employed as starting materials, the resulting bischloroformates are, following a single recrystallization, satisfactory for use in the formation of high molecular weight polymers, if good quality starting materials are employed. Because of their broad areas of application as chemical intermediates, it is particularly of interest that the aromatic chloroformates can be prepared in high conversion and yield by a relatively simple technique.

The chloroformates obtained by the process of this invention may be utilized as chemical intermediates in many applications, particularly in reactions with active hydrogen compounds. The carbamate obtained from 2,4,6-trichlorophenyl chloroformate and dimethylamine is reported in U.S. Patent No. 2,854,374 to be useful as an insecticide. Thermoplastic polycarbonates may be made by the reaction between equimolar quantities of a bischloroformate and a bisphenol, as disclosed in U.S. Patents Nos. 3,028,365 and 3,036,036. The polyurethane prepared from piperazine and the bischloroformate of 2,2-bis(4-hydroxyphenyl) propane is shown in U.S. Patent No. 2,731,445 to be useful in making a strong fiber.

What is claimed is:

1. A process for preparing an aromatic ester of chloroformic acid which comprises reacting phosgene with a phenol in the presence of a catalytic amount of from 0.5% to 10% by weight of the phenol of a compound of the formula

wherein X is a radical selected from the group consisting of

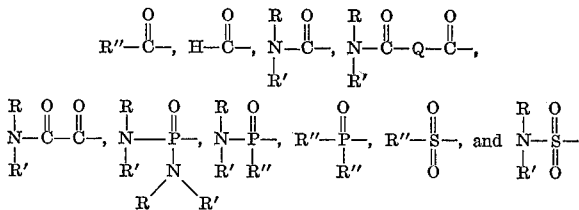

and the thio analogues of the carbonyl radicals, wherein R and R' are selected from the group consisting of alkyl radicals of 1–4 carbon atoms and monovalent aromatic hydrocarbon radicals of from 6–8 carbon atoms, R and R' taken together may be a part of a cyclic structure containing from 3–6 carbon atoms in the ring and R and X may together form and be part of the cyclic structure containing from 3–6 carbon atoms in the ring; Q is a divalent hydrocarbon radical of from 1–8 carbon atoms and R'' is selected from the group consisting of alkyl radicals of from 1–6 carbon atoms and an aromatic monovalent hydrocarbon radical of from 6–8 carbon atoms, R'' may combine with R or R' to form a cyclic structure containing from 5–7 nuclear atoms, said reaction being effected at a temperature of between about 80° and 200° C. at superatmospheric pressure.

2. A process for preparing hydroquinone bischloroformate which comprises reacting phosgene with hydroquinone in the presence of a catalytic amount of from 0.5% to 10% by weight of the phenol of N,N-dimethylformamide at a temperature of between about 80° and 200° C. and at superatmospheric pressure.

3. A process for preparing the bischloroformate of 2,2-bis(4-hydroxyphenyl)propane which comprises reacting phosgene with 2,2-bis(4-hydroxyphenyl)propane in the presence of a catalytic amount of from 0.5% to 10% by weight of the phenol of N,N-dimethylformamide at a temperature of between about 80° and 200° C. and at superatmospheric pressure.

4. A process for preparing the chloroformate of phenol which comprises reacting phosgene with phenol in the presence of a catalytic amount of from 0.5% to 10% by weight of the phenol of N,N-dimethylformamide at a temperature of between about 80° and 200° C. and at superatmospheric pressure.

5. A process for preparing hydroquinone bischloroformate which comprises reacting phosgene with hydroquinone in the presence of a catalytic amount of from 0.5% to 10% by weight of the phenol of N-methylpyrrolidone at a temperature of between about 80° and 200° C. and at superatmospheric pressure.

6. A process for preparing hydroquinone bischloroformate which comprises reacting phosgene with hydroquinone in the presence of a catalytic amount of from 0.5% to 10% by weight of the phenol of N,N-dimethylmethylsulfonamide at a temperature of between about 80° and 200° C. and at superatmospheric pressure.

7. A process for preparing hydroquinone bischloroformate which comprises reacting phosgene with hydroquinone in the presence of a catalytic amount of from 0.5% to 10% by weight of the phenol of N,N,N',N'-tetramethylurea at a temperature of between about 80° and 200° C. and at superatmospheric pressure.

8. A process for preparing hydroquinone bischloroformate which comprises reacting phosgene with hydroquinone in the presence of a catalytic amount of from 0.5% to 10% by weight of the phenol of hexamethylphosphoramide at a temperature of between about 80° and 200° C. and at superatmospheric pressure.

References Cited by the Examiner

UNITED STATES PATENTS

| | | | |
|---|---|---|---|
| 2,370,570 | 2/45 | Muskat et al. | 260—463 |
| 2,370,571 | 2/45 | Muskat et al. | 260—463 |
| 2,455,652 | 12/48 | Bralley et al. | 260—463 XR |
| 2,873,291 | 2/59 | Spiegler | 260—463 |
| 3,149,155 | 9/64 | Seefelder | 260—544 |

FOREIGN PATENTS

| | | |
|---|---|---|
| 808,490 | 2/59 | Great Britain. |
| 251,805 | 1/12 | Germany. |

OTHER REFERENCES

Ludwig et al., "J.A.C.S.," vol. 73, pp. 5779–5781 (1951).

Oesper et al., "J.A.C.S.," vol. 47 pp. 2609–2610 (1925).

Schnell et al., Makromol Chem., vol 57, pp 1–11 (1962).

Strain et al., "J.A.C.S.," vol. 72, pp. 1254–1263 (1950).

Wagner and Zook, "Synthetic Organic Chemistry," pages 483–4 (1953).

CHARLES B. PARKER, *Primary Examiner.*